United States Patent Office.

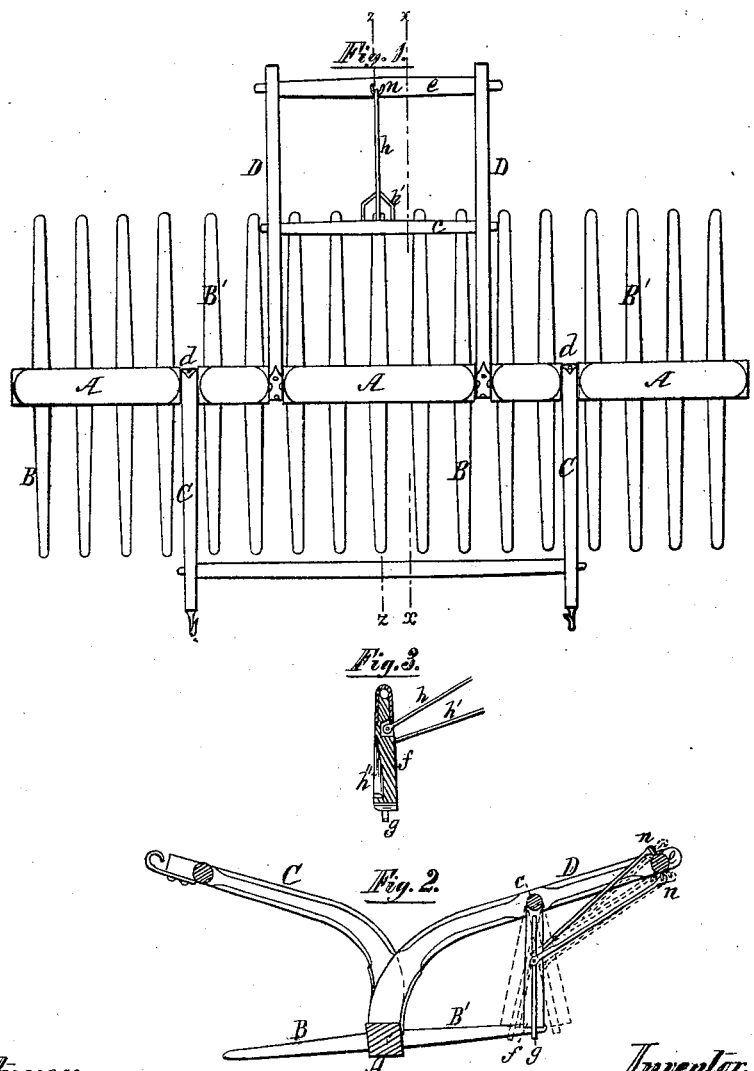

ANDREW S. LAZIER, OF NORTH PARMA, NEW YORK.

Letters Patent No. 95,361, dated September 28, 1869.

IMPROVEMENT IN HORSE-RAKES.

The Schedule referred to in these Letters Patent and making part of the same.

*To all whom it may concern:*

Be it known that I, ANDREW S. LAZIER, of North Parma, in Monroe county, and State of New York, have invented certain new and useful Improvements in Horse-Rakes; and do hereby declare that the following is a full, clear, and exact description thereof, reference being had to the accompanying drawing, through letters of reference marked thereon, forming part of this specification, and in which—

Figure 1 represents a top or plan view of a rake, embracing my improvements.

Figure 2, a sectional view, taken on the line $x\ x$ on fig. 1.

Figure 3, a vertical section of the pendant-support, on the line $z\ z$ on fig. 1.

The object of this invention is, the better to provide for the dumping of the load when the rake is full, by means under control of the driver.

Referring to the drawings—

A represents the rake-head or bar, through which the teeth B are passed, so as to form a rake on either side thereof.

These teeth are inserted diagonally through the head, as shown more clearly in fig. 2; or the head may be formed with two acute and two obtuse angles in its cross-section, and the teeth so inserted that when their forward points are in contact with the ground, the under side of the head A shall be so inclined, in relation to said teeth, as to lie flat on the ground, to avoid the dragging or scraping of the earth with its forward edge, whereby, as ordinarily constructed, power is expended, and dirt mixed with the hay in gathering it.

To the head A are attached futchels C, by means of bands $d$, spanning it at rounded portions, in such manner that it is capable of rotating therein when permitted so to do; and to these futchels, thills, or other suitable means for gearing the horse, may be attached.

To the rake-head A is also similarly attached, in a rearward direction, the hand or guide-frame D, having a fixed cross-bar, $c$, about vertically over the end of the rearward teeth B', and an oscillating cross-bar, $e$, near its end.

On the cross-bar $c$ is pivoted a pendant, $f$, and a stirrup, $g$, which are respectively connected by rods $h$ $h'$ and staples or levers $n$, with the opposite sides of the oscillating bar $e$, so that by turning said bar in the one direction, the pendant will be pushed forward and the stirrup drawn back, and by turning it in the opposite direction, their motion will be reversed.

In operating this rake, the point of one or more of the rearward teeth is, or are, retained between the pendant $f$ and the stirrup $g$, which are retained by the operator, through means of the oscillating bar $e$, in the same vertical plane until a sufficient load is gathered on the forward teeth, at which time he turns said bar, so as to push the stirrup forward and draw the pendant back clear of the tooth or teeth, when the rake-head is immediately caused to revolve by the weight of the load on the forward teeth; and during such revolution, the oscillating bar $e$ must be turned in the opposite direction, by which the stirrup is drawn back, and the pendant pushed forward to receive the coming rear tooth, and prevent a second revolution of the rake-head. The pendant and stirrup are then brought into the same vertical plane as before. This operation is to be repeated as often as the rake becomes loaded in its passage over the ground.

The three relative positions of the pendant $f$ and stirrup $g$ are shown respectively in black, red, and blue outline, in fig. 2 of the drawing.

In fig. 3, the pendant is shown as having a cavity, $h''$, in its forward side. This is used only in case the operator is of small stature, and the guide-frame, with the pendant above the tooth, would be inconveniently high, in which case the point of the tooth may be retained in such cavity, thus lowering the rearward portion of said guide-frame D.

Having thus described my invention,

What I claim as new, and desire to secure by Letters Patent, is—

The combination and arrangement of the pendant $f$, stirrup $g$, and oscillating bar $e$, having staples or levers $n$, and rods $h\ h'$, substantially as and for the purpose set forth.

ANDREW S. LAZIER.

Witnesses:
W. MORRIS SMITH,
SIDNEY E. SMITH.